(12) United States Patent
Armiroli et al.

(10) Patent No.: US 7,116,020 B2
(45) Date of Patent: Oct. 3, 2006

(54) ALTERNATOR, IN PARTICULAR FOR MOTOR VEHICLE

(75) Inventors: Paul Armiroli, Marolles En Brie (FR); Alain Lozac'h, Maisons Alfort (FR)

(73) Assignee: Valeo Equipements Electriques Moteur, Creteil (FR)

(*) Notice: Subject to any disclaimer, the term of this patent is extended or adjusted under 35 U.S.C. 154(b) by 0 days.

(21) Appl. No.: 10/497,231

(22) PCT Filed: Dec. 12, 2002

(86) PCT No.: PCT/FR02/04328

§ 371 (c)(1),
(2), (4) Date: Dec. 3, 2004

(87) PCT Pub. No.: WO03/050933

PCT Pub. Date: Jun. 19, 2003

(65) Prior Publication Data

US 2005/0082922 A1    Apr. 21, 2005

(30) Foreign Application Priority Data

Dec. 12, 2001  (FR) .................................. 01 16088

(51) Int. Cl.
*H02K 1/12* (2006.01)
(52) U.S. Cl. ..................... 310/68 D; 310/90; 310/254
(58) Field of Classification Search .............. 310/68 D, 310/68 R, 254, 261, 90, 59; 322/77
See application file for complete search history.

(56) References Cited

U.S. PATENT DOCUMENTS

| 3,560,841 | A | * | 2/1971 | Pannen et al. ................. 322/73 |
| 4,161,775 | A |   | 7/1979 | Franz et al. |
| 5,296,770 | A |   | 3/1994 | Pflueger et al. |
| 5,424,599 | A | * | 6/1995 | Stroud ........................ 310/198 |
| 6,275,404 | B1 |  | 8/2001 | Shichijyo et al. |
| 6,285,100 | B1 |  | 9/2001 | Pflueger et al. |
| 6,366,000 | B1 | * | 4/2002 | Higashino et al. .......... 310/260 |
| 6,812,604 | B1 | * | 11/2004 | Braun et al. ............... 310/68 D |

FOREIGN PATENT DOCUMENTS

| DE | 44 39 863 A1 | 5/1996 |
| FR | 2 752 110 | 2/1998 |
| FR | 2 803 132 | 6/2001 |
| FR | 2 807 232 | 10/2001 |

* cited by examiner

*Primary Examiner*—Thanh Lam
(74) *Attorney, Agent, or Firm*—Berenato, White & Stavish

(57) ABSTRACT

The alternator comprises a stator (12), a rotor (4) disposed inside the stator (12) and having a plurality of phases, and at least two armature windings, each of which is part of a power supply source connected between earth and a power supply line, each source also comprising a bridge of rectifying elements and an auxiliary bridge of rectifying elements, characterised in that the auxiliary bridges of rectifying elements are arranged centrally with respect to the bridges of rectifying elements of the two sources, and in that the said bridges are carried by a support which is fixed with respect to the rear bearing of the alternator.

9 Claims, 8 Drawing Sheets

US 7,116,020 B2

ALTERNATOR, IN PARTICULAR FOR MOTOR VEHICLE

TECHNICAL FIELD OF THE INVENTION

The present invention relates in general terms to alternators, or alternator-starters, for motor vehicles.

More precisely, the invention relates to an alternator comprising a stator having a plurality of phases and surrounding a rotor which is fixed with respect to a shaft that is arranged to be rotated by the internal combustion engine of the motor vehicle via a transmission device comprising at least one belt and a drive member such as a pulley fixed with respect to the rotor shaft.

STATE OF THE ART

The stator has at least two armature windings which are connected to a current rectifying device of an electrical power supply apparatus, in particular for feeding the on-board network of a motor vehicle.

In the document WO01/76052, the armature windings are each part of a power supply source which is connected between earth and a power supply line. Each source comprises at least one armature winding and a bridge of rectifying elements such as diodes.

One of these two sources comprises an auxiliary bridge of rectifier elements of positive type, the other an auxiliary bridge of rectifier elements of negative type, with a means, connected to one and to the other of the said two bridges, being adapted to be controlled, for the purpose of:

in a first state, connecting the two auxiliary bridges in series, the rectified voltage supplied to the supply line being then the sum of the voltages supplied by the armature winding or windings of each of the two sources and rectified, in a second state, blocking the connection between the two sources, which then feed the power supply line in parallel.

The performance of these alternators is, as a result, quite remarkable.

OBJECT OF THE INVENTION

The object of the present invention is to take advantage of this arrangement in a simple and inexpensive way.

According to the invention, an alternator of the type described above is characterised in that the auxiliary bridges of rectifying elements are arranged centrally with respect to the bridges of rectifying elements of the two sources, and in that the said bridges are carried by a support which is fixed with respect to the rear bearing of the alternator.

Thanks to the invention, the available space is occupied in the best possible way, the auxiliary bridges being located inside the other bridges.

In a first embodiment, it is the rear bearing that itself carries the rectifying and auxiliary bridges.

In another embodiment, the rectifying and auxiliary bridges are carried by an intermediate face plate, which is fixed with respect to the rear bearing of the alternator.

According to a further feature, the rear bearing or the face plate fixed with respect to the rear bearing, is water cooled.

In another embodiment of the invention, each bridge of rectifying elements comprises diodes, the said diodes being grouped by phase and carried by the rear bearing of the alternator.

In all cases, the means connecting the two auxiliary bridges to each other preferably consist of at least one transistor of the CMOS type interposed between the two auxiliary bridges.

Preferably, a plurality of transistors of the CMOS type, mounted in parallel, are provided.

The said transistors are integrated with the bridges of rectifying elements, being mounted on the rear bearing or on the face plate fixed with respect to the rear bearing.

Preferably, a voltage limiting circuit is associated with the bridges and with the CMOS type transistors.

BRIEF DESCRIPTION OF THE DRAWINGS

Further features and advantages of the invention will appear more clearly from the description which is given below, by way of explanation but in no way limiting, and with reference to the accompanying drawings, in which.

DETAILED DESCRIPTION OF SOME EMBODIMENTS OF THE INVENTION

The general structure of a polyphase alternator for a motor vehicle will first be described, with reference to FIG. 1.

Figure 1:
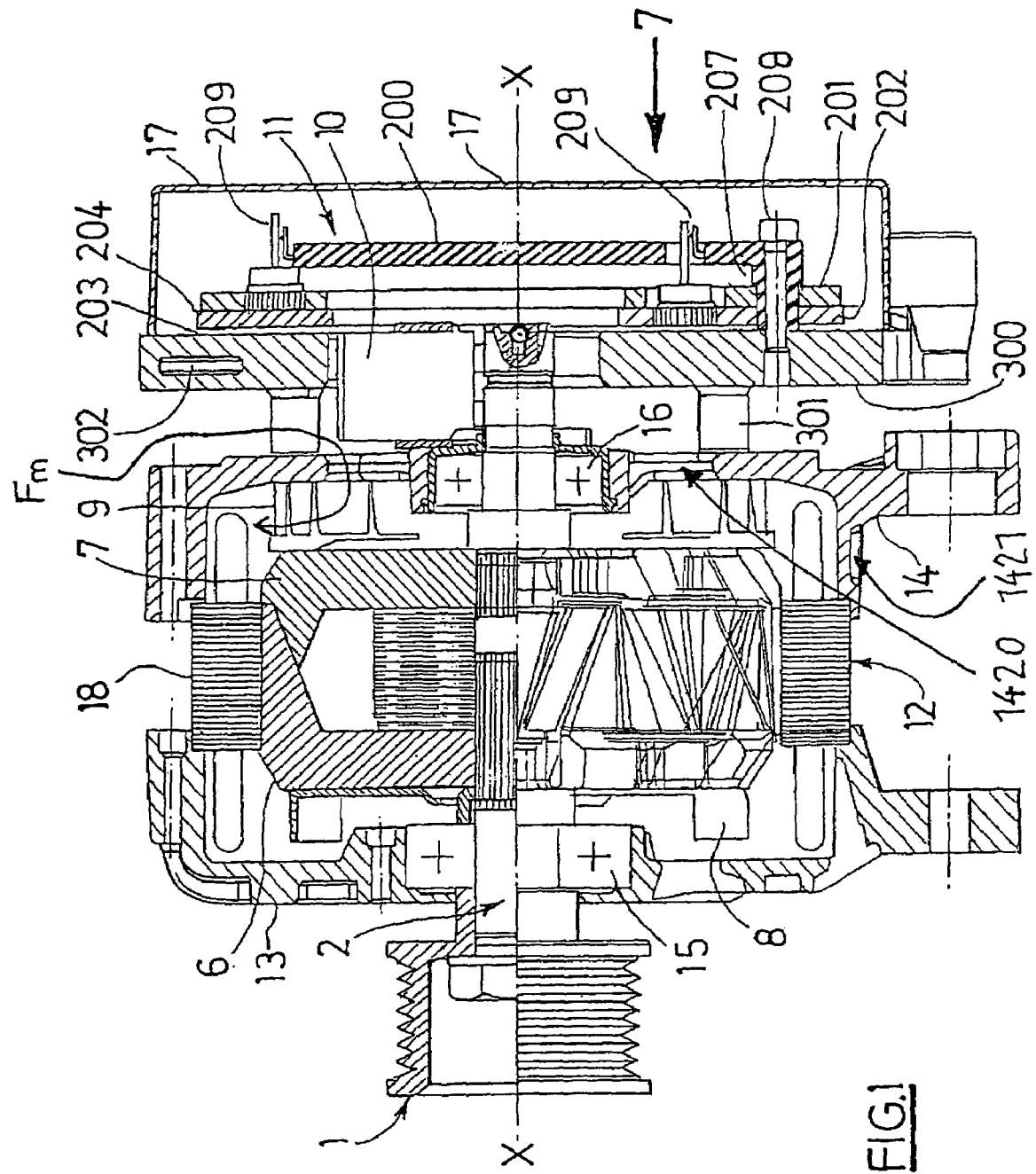
FIG. 1 is a view in cross section of an alternator in accordance with the invention.

The alternator, going from left to right in FIG. 1, that is to say from the front to the rear, comprises a drive pulley 1 which is fixed, here by a screw, with respect to the front end of the shaft 2, the rear end of which carries slip rings (not given reference numerals) which are part of a collector 3. The axis of the shaft 2 is the axis of rotation X—X of the machine.

Figure 3:
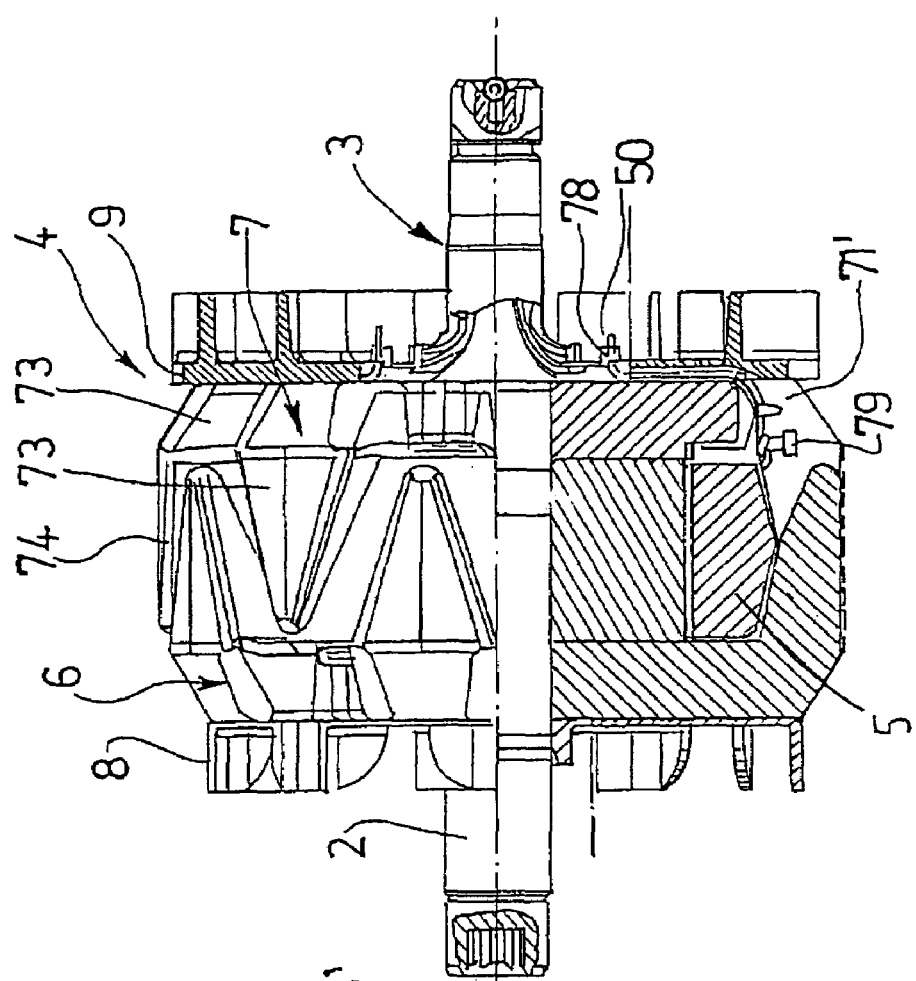
FIG. 3 is a top plan view, partly cut away, of the rotor in the alternator of FIG. 1.

The shaft 2 carries, fixed to it centrally, the rotor 4 which is provided with an excitation winding 5, the ends of which are connected through links to the collector 3, as can be seen in FIG. 3. Preferably, the excitation winding is barrel shaped, so as to fill as much as possible of the space defined between the internal face of a set of teeth, which will be described later herein, and the core of the rotor. The rotor 4 in this example is a claw type rotor of the Lundel type, and accordingly has two pole wheels, namely a front pole wheel 6 and a rear pole wheel 7, each of which carries a respective front fan 8 and rear fan 9, so that for a given size, it enables the power of the machine to be increased and the noise from the latter to be decreased. Each wheel 6, 7 comprises a radial plate at right angles to the axis of the shaft 2. At the outer periphery of the radial plates, axially extending teeth are formed. The teeth are of trapezoidal form, and, in order to reduce noise from the machine even more, they are formed with anti-noise chamfers at the level of the zone at which they are rooted to their radial plate, as described in the document EP-B-0 515 259, to which reference should be made for more detail. The teeth of one of the wheels are directed towards the other wheel, and are offset circumferentially with respect to the teeth in that other wheel. The teeth are therefore interleaved in such a way that, in one embodiment, permanent magnets are interposed between the teeth in order to increase the power of the machine even more. For example, profiled grooves are formed in the lateral edges of the teeth in order to receive the permanent magnets, as described in the document FR-A-2 784 248. When the winding 5 is activated, the rotor 4 is magnetised and it therefore defines pairs of magnetic poles, with each pole wheel then comprising, respectively, N north poles and N south poles which are constituted by the teeth. For more details about this, reference should be made to the document EP-A-0 515 259, each tooth of the pole wheels having at least one anti-noise lateral chamfer. In this example, each pole wheel has seven teeth. This does of course depend on the application.

Figure 2:
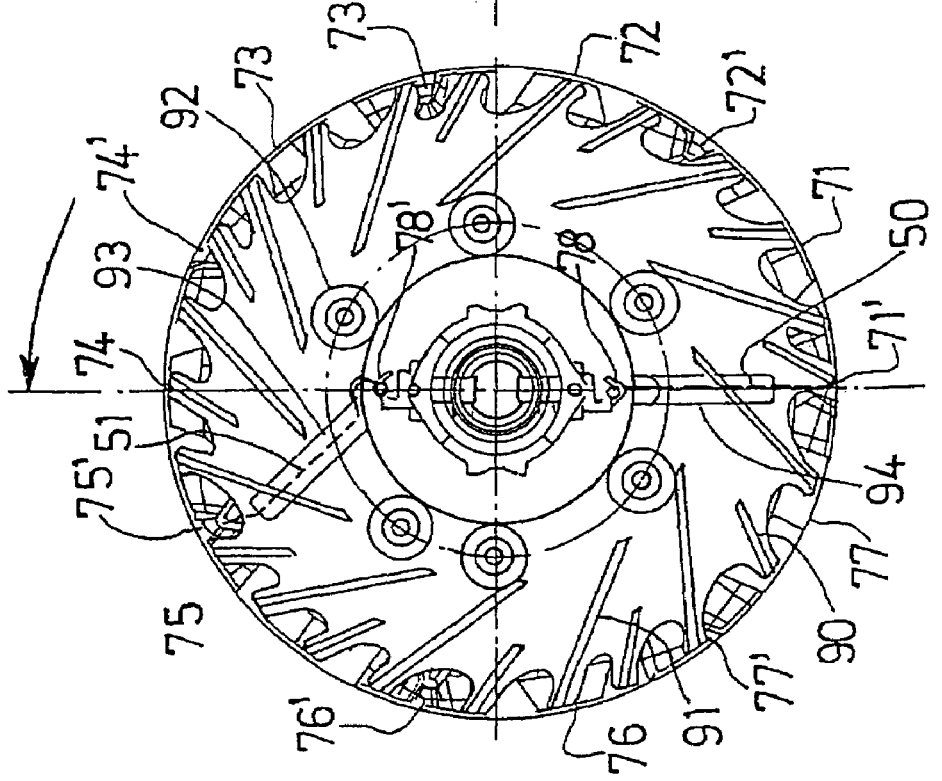
FIG. 2 is a back view of one form of construction of the rotor in the alternator of FIG. 1.

The fans 8, 9 comprise for example two sets of blades or vanes 90 and 91 of different lengths as can be seen in FIG. 2, defining ventilation channels between them. The blades are formed as projections by press-forming and bending in a fixed plate, for example by welding 92 or any other means such as seaming, on the appropriate pole wheel 6, 7; each wheel has, as mentioned above, axial teeth which are directed towards the other wheel, with the teeth of one wheel being interleaved with the teeth of the other so as to define magnetic poles when the winding 5 is activated, by virtue of the slip rings of the collector 3, each of which is in contact with a brush (not given a reference numeral) carried by a brush carrier 10, which also serves to support a voltage regulator (not shown) which is electrically connected to the brushes.

The regulator is connected to a current rectifying device 11, such as a diode bridge (two of which can be seen in FIG. 1), which is itself connected to the outputs of the phases provided with windings, which are part of the stator 12 of the alternator that surrounds the rotor 4.

The fans 8, 9 are located close to a front bearing 13 and a rear bearing 14 respectively. The bearings 13, 14 are of metal and in this example an aluminium based metal. The bearings 13, 14 include lugs for fastening them on a fixed part of the vehicle. It is by means of these bearings that the alternator can be earthed. The bearings 13, 14 are perforated in order to provide internal ventilation for the alternator through the fans 8, 9 when the assembly consisting of the fans 8, 9, the rotor 4 and the shaft 2 is rotated by the pulley 1, which is coupled to the engine of the motor vehicle through a transmission device which comprises at least one belt engaged with the pulley 1. This ventilation enables the windings of the stator 12 and the winding 5 to be cooled, and also the brush holder 10 with its regulator and the current rectifying device 11. The coolant fluid, which is air in this example, flows through the various apertures in the bearings 13, 14 and penetrates into the interior of the machine in a manner known per se. The fluid is blown by the fans 8, 9 over the chignons which are part of the windings of the stator 12, in a manner described later herein. The fluid then preferably leaves through radial ears which are present on the rear and/or front bearings. The two bearings are of hollow form, and each of them comprises a transverse plate which is extended at its outer periphery by an axially oriented annular flange which is shouldered at its free end, for mounting and centring a body 18 of the stator 12. A radial air gap exists between the outer periphery of the teeth of the rotor 4 and the inner periphery of the body 18 of the stator 12 carried by the bearings 13, 14, to constitute a casing. The radial plates and flanges of the bearings are perforated to give air circulation. Apertures accordingly exist facing the chignons of the stator.

The rectifying device 11, the brush holder 10, and a perforated protective end cap 17, which in this example is of moulded plastics material, are carried by and fastened to the bearing 14, in such a way, as described later herein, that the rear fan 9 is more powerful than the front fan 8, because it provides for cooling of the electronic power apparatus and the stator. In a known way, the bearings 13, 14 are joined together, in this example by means of screws, or, in another version, by stretchers which are not shown, so as to constitute a support casing adapted to be mounted, as mentioned above, on a fixed part of the vehicle.

Each of the bearings 13, 14 carries a central ball bearing 15, 16 for supporting in rotation the front and rear ends of the shaft 2, which extends through the bearings to carry the pulley 1 and the slip rings 3. The collector is of the conventional type. More precisely (FIGS. 2 and 3), the input wires 50 and output wires 51 of the winding 5 of the rotor are connected to the collector 3. In order to make it possible to use a conventional collector of symmetrical form, as already used for alternators with an even number of pole pairs, an advantageous arrangement is provided which will now be described with reference to FIGS. 2 and 3.

As explained earlier herein, the rotor has two pole wheels, namely the front wheel 6 and rear wheel 7, each of which carries at its periphery teeth which are given the reference numerals 71 to 77, and which follow the periphery of the rear pole wheel in the normal direction of rotation of the rotor 4, as indicated by an arrow in FIG. 2. Each pole wheel has seven teeth, since the alternator, in the first embodiment, has seven pole pairs.

The teeth 71 to 77 of the rear pole wheel are separated from each other by notches 71' to 77'.

The rotor 4 also includes two hook elements 78 and 78', carried by the rear face of the rear pole wheel 7. The hook elements 78 and 78' are situated close to the shaft 2, and are diametrically opposed to each other with reference to the axis of the shaft 2. They are connected electrically to the collector 3.

The input wire 50 connects the hook element 78 to the winding 5. It extends radially from the hook element 78 to the first groove 71'.

In the prior art, the output wire 51 connects the hook 78' to the winding 5, passing through a hole formed in the base of the tooth 74, that is to say in a direction which is exactly opposed diametrically to the first groove 71'. The two input and output wires, 50 and 51, are symmetrical about the axis of rotation of the machine, and this apparatus is therefore adapted to a conventional collector 3.

That solution has the following drawbacks. The passage cross section for the magnetic flux is reduced by the presence of the hole, and this in the most saturated part of the rotor, which is accordingly detrimental to the performance of the machine.

The mounting of the winding 5 is adversely affected because it is necessary to pass the output wire 51 into the hole blind, and this gives rise to the risks of numerous manufacturing faults.

Finally, the hole is situated close to the earth, which gives rise to risks of short circuits.

In accordance with one feature, the output wire 51 extends radially from the hook 78' to a second groove, this second groove being the groove 74' or the groove 75', these two grooves being diametrically opposed to the groove 71'.

Preferably, the output wire 51 passes through the groove 75', because this arrangement is more favourable for the hooking engagement to the hook element 78'.

This arrangement avoids the need to form a hole in the rotor, but nevertheless enables the input and output wires 50 and 51 to be connected to a symmetrical collector 3.

Capstans 79 are situated in the grooves 71' and 74' or 75'. Each of these capstans 79 comprises a radial rod which is fixed to the rotor at one end, and a tile element mounted at the opposite, free, end.

The input and output wires 50 and 51 each make one turn of the capstan 79 respectively situated in the first and second grooves 71' and 74' or 75', before rejoining the winding 5.

It should be noted that this arrangement of the input and output wires 50 and 51 makes it necessary to provide a passage for the wires in the rear fan 9.

This arrangement can obviously be used with any kind of rotor whatsoever which has an odd number of pole pairs. In another version, the number of magnetic pole pairs is even, with each pole wheel having six or eight teeth.

Preferably, the rear fan 9 is formed with reliefs 93 and 94 which enable the wires 50 and 51 to pass between the radial plate of the rear pole wheel and the fan, respectively.

Figure 4:
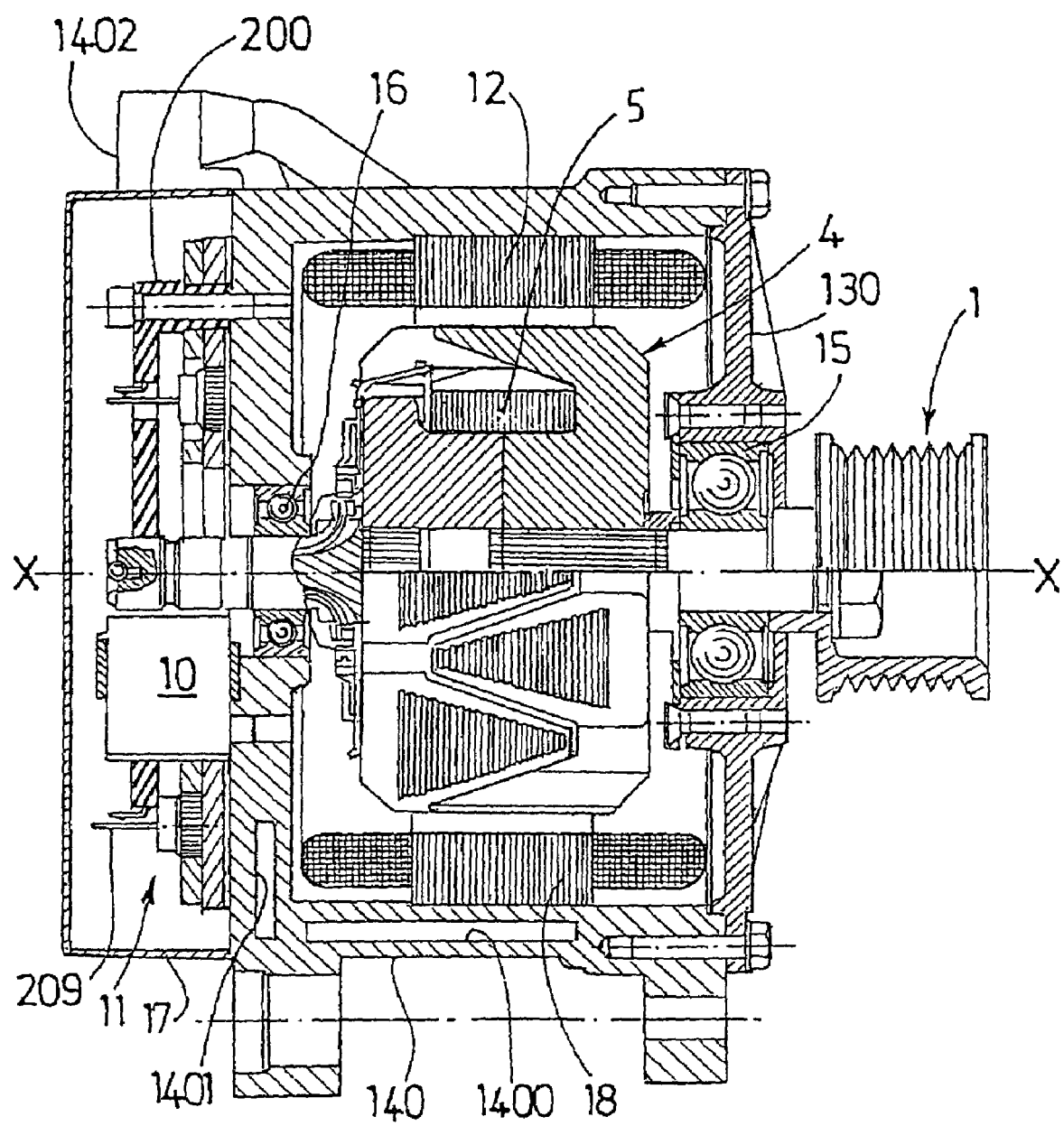
FIG. 4 is a view similar to FIG. 1, but shows a second embodiment of the invention.

In another version (FIG. 4) the alternator can of course be cooled by a liquid, such as water from the cooling circuit of the internal combustion engine of the motor vehicle. In FIG. 4, the alternator has no fans, and the front bearing 130 is reduced to a simple plate, while the rear bearing 140, which is hollow, has chambers 1400 and 1401 formed respectively in its peripheral flange and in its rear end plate. These chambers are connected to output and input pipes for the cooling liquid, one of which can be seen at 1402. These pipes are connected to the coolant circuit of the engine of the motor vehicle, so that water flows into the chambers 1400 and 1401 to remove the heat. The alternator is therefore able to be of higher power. It will be noted that helical grooves are formed in the outer periphery of the teeth of the rotor, in the manner described in the document FR-A-2 774 524, so as to cut the Foucault currents. The body 18 of the stator is of course, in another version, in direct contact with the coolant liquid in the manner described in the document FR-A-2 793 083. In a further version, the alternator can of course be equipped with axial fans as described in the document FR 01 01526 filed on May 2, 2001, so that in one embodiment, the alternator is both water cooled and air cooled.

In a further version, the rotor has projecting poles, with permanent magnets incorporated in the rotor, in the manner described in the document FR 01 00122 filed on May 1, 2001. In that case, the housings for the magnets are closed at each end by a magnetic retaining member. The rotor then comprises a plurality of excitation windings which are wound around the projecting poles; the rotor includes a stack of laminations.

The alternator can of course have a rotor which is provided with two excitation windings, with each winding being mounted between the two end plates of two pole wheels as in FIGS. 1 and 4. In that case, the number of pole wheels is doubled up; two pairs of pole wheels are then provided.

In a known way, the body 18 of the stator 12 consists of a stack of laminations with notches defining grooves for the fitting of the armature windings of the stator. Each winding comprises electrically conductive elements which are insulated from each other and which extend through the body of the stator so as to form on the outside of the body networks constituting chignons which project on either side of the body 18. The windings are formed of wires, though in another version they may be electrically conductive elements such as hairpins.

The coils of the stator are those of armature windings with two electrical power supply sources, which are both connected between earth and a power supply line from the on-board network of the motor vehicle. Rectifier bridges, in the rectifying device 11, are associated with these windings.

In the known way, when the shaft 2 of the alternator is rotated by the engine of the vehicle via the pulley 1—with the rotor winding 5 being excited—the stator, with its armature windings, constitutes an induced circuit or armature which generates an alternating armature current rectified to direct current by the rectifying device 11, whereby to power the power consuming equipment of the vehicle and to recharge the battery of the vehicle. The armature windings are connected to the current rectifying device in such a way as to work in series and in parallel, in the manner described in the document WO01/76052, to which reference should be made for more detail.

More precisely, the coils of the armature windings are part of the electrical power supply apparatus, in particular for the on-board network of the motor vehicle, comprising at least two power supply sources which are both connected between earth and a power supply line, and each of which comprises at least one armature winding and a bridge consisting of rectifier elements. One of these two sources comprises an auxiliary bridge of rectifier elements of positive type, the other an auxiliary bridge of rectifier elements of negative type, which a means, connected to one and to the other of the said two bridges, being adapted to be controlled, for the purpose of:

in a first state, connecting the two auxiliary bridges in series, the rectified voltage supplied to the supply line being then the sum of the voltages supplied by the armature winding or windings of each of the two sources and rectified, in a second state, blocking the connection between the two sources, which then feed the power supply line in parallel.

Such an apparatus is preferably completed by the following various features:

the two sources are three-phase sources;

one control means is a controllable interrupter interposed between the two auxiliary bridges;

one control means is a controlled diode interposed between the two auxiliary bridges;

one control means is a transistor of the CMOS type interposed between the two auxiliary bridges;

one control means comprises controlled diodes which constitute rectifying elements of one and/or the other of the two auxiliary bridges;

the diodes of the two auxiliary bridges are carried by a common support;

the two sources are synchronous sources, with the rectifying elements of the two auxiliary bridges being connected in pairs and providing the connection between the phases of the two sources that correspond with them, the branches connecting two rectifying elements of one and the other of the two auxiliary bridges being connected in pairs by means defining an interrupter, the said interrupter means constituting the control means;

the two sources are three-phase synchronous sources, and the control means include at least one double interrupter;

the two armature windings consist of a delta wound armature winding and a star wound armature winding, respectively;

the delta wound armature winding comprises a number of turns per slot which is equal to the number of turns per slot in the star wound armature winding or coil multiolied by the square root of the number of phases in the electrical machine.

It is of course clearly possible also to make use, in a manner known per se, of two delta windings or two star windings.

In FIGS. 1 and 4 two three-phase sources are provided, comprising armature windings associated with bridges of rectifier elements. The armature windings are stator windings of a common alternator described above. Each of the bridges consists of two diode half bridges, one of which is positive and the other negative. These bridges are part of the rectifying device 11.

Each of the two sources is also associated with an auxiliary bridge, of rectifying elements such as diodes.

Figure 5:
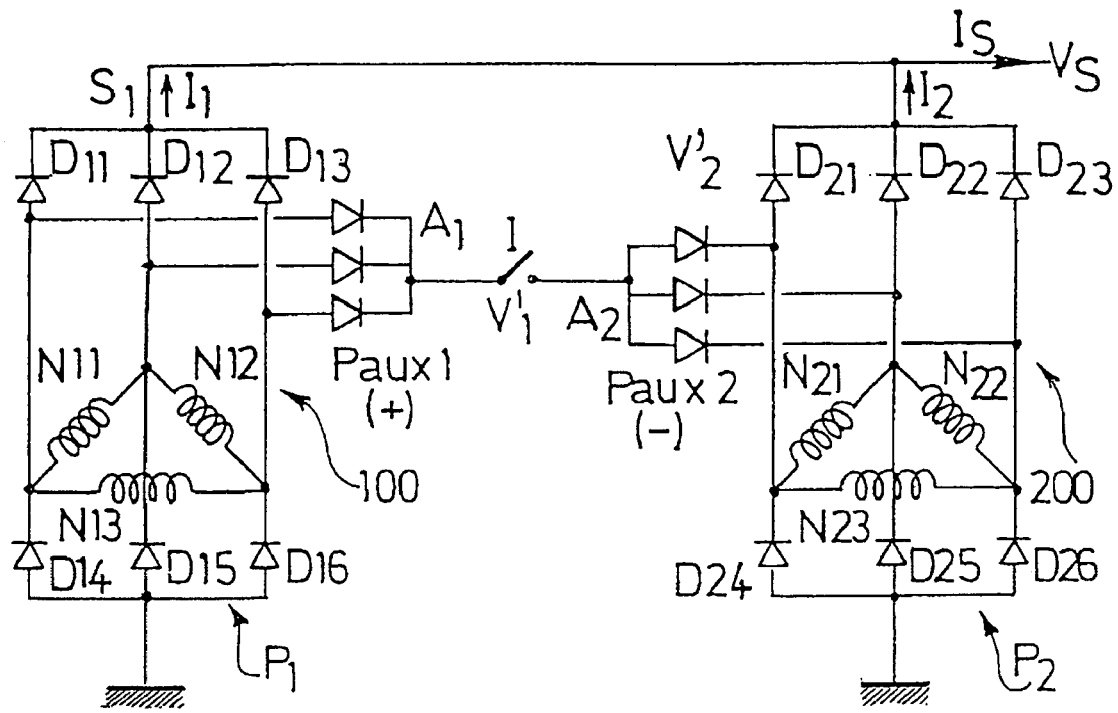
FIG. 5 is a circuit diagram of an electrical power supply apparatus having two three-phase sources and mounted on the alternator of FIGS. 1 and 4.

One possible arrangement with three-phase sources is shown in FIG. 5.

The three-phase windings of the first source have been given the references N11, N12, N13, while those of the second source are referenced N21, N22 and N23.

The positive diodes of the bridge P1 associated with the first source are referenced D11, D12, D13, while the negative diodes are referenced D14, D15 and D16.

The positive diodes of the bridge P2 associated with the second source are themselves referenced D21, D22, D23, while its negative diodes are referenced D24, D25 and D26.

The two auxiliary bridges, one of the positive type and the other of the negative type, are referenced $P_{aux1}$ and $P_{aux2}$. The diodes of the bridge $P_{aux1}$ are connected to the armature windings of source 1 through their anodes, while the diodes of the bridge $P_{aux2}$ are connected to the armature windings of source 2 through their cathodes. A controlled interrupter I is interposed between the points A1 and A2, which are respectively the point to which the diodes of the bridge $P_{aux1}$ are connected through their cathodes and the point to which the diodes of the point $P_{aux2}$ are connected through their anodes.

The operation of such a device is as follows.

In the case where the interrupter I is closed, the voltage V'1 measured at the point A1 is the rectified voltage delivered by the first three-phase source (source 1).

The value of the voltage Vs is then the sum of V'1 and V'2, where V'2 is the value of the rectified voltage delivered by the second three-phase source (source 2). Since the voltage Vs is greater than V'1, the positive diodes of the bridge P1, namely D11, D12, D13, are reverse polarised; in consequence, they isolate the three-phase system 1 from the output voltage Vs, the current 11 being consequently zero. The negative diodes of the bridge 2, namely D24, D25, D26, are themselves polarised by V'1 which is greater than 0; they are then also blocked and isolate the three-phase system 2 from earth.

Once the interrupter I is open, the two three-phase systems operate once again in parallel, the current Is being then the sum of 11 and 12.

Numerous modified embodiments can of course be envisaged in practice.

Figure 6:
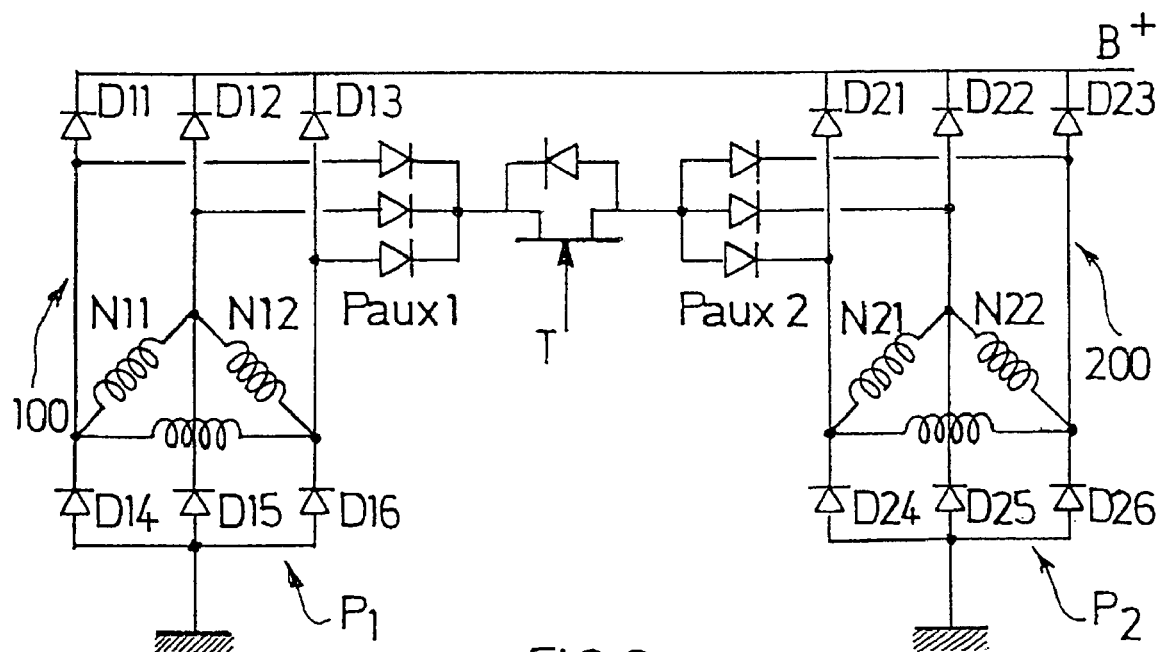
FIG. 6 is a view similar to FIG. 5, showing another version.

In particular, the interrupter I may be replaced, either by a controlled diode or by a transistor T of the CMOS type as shown in FIG. 6.

In this latter case, the transistor T of the CMOS type must be so oriented that the specific diode with which it is associated in parallel, by construction, is opposed to the diodes of the two auxiliary bridges.

In another version, the CMOS transistor T is replaced by three CMOS transistors T1 in parallel, so as to reduce the internal resistance, with each transistor comprising a free wheel diode.

In accordance with one feature of the invention, the auxiliary bridges of rectifying elements are connected centrally with respect to the rectifier bridges P1, P2 from the two sources. The bridges P1, P2, which are referred to as main bridges, together with the auxiliary bridges, are carried by a support which is fixed with respect to the rear bearing of the alternator. The auxiliary bridges are mounted centrally in such a way that they are situated close to the axis of rotation X—X of the rotary electrical machine. Thus, the connection of the auxiliary bridges with the rectifier bridges is, with advantage, facilitated.

The diodes of the auxiliary bridges are then surrounded by the diodes of the main bridges.

In FIG. 4, it is the wall oriented transversely with respect to the axis X—X of the rear bearing 140 that directly carries the bridges and therefore the rectifier device, given that this bearing is water cooled.

In FIG. 1, according to one feature, it is a face plate 300 that carries the rectifier device, the face plate being fastened, for example by means of spacer bars 301, on the rear bearing 14. The face plate 300 is of metal, preferably an aluminium based metal, and includes a chamber 302 which is connected to input and output ducts connected to the coolant circuit of the engine of the motor vehicle as in FIG. 4.

In one embodiment, the face plate 300 has a local aperture for mounting, within its thickness, the sub-assembly 10 consisting of the brush holder-regulator. The length of the spacers 301 is a function of the thickness of this sub-assembly 10. The spacers enable air to circulate. In another version, the face plate 300 does not have the chamber 302, cooling being provided only by the air stream which plays on the front face of the face plate 300. The arrow Fm indicates the direction of flow of the coolant fluid, which enters radially between the rear face of the rear bearing and the front face of the face plate 300. Subsequently the coolant fluid penetrates into the interior of the alternator through the input ears 1420, under the aspiration effect set up by the rear fan 9. The air subsequently leaves through radial ears 1421 situated on the rear bearing. Liquid and air cooling may be combined to improve the cooling of the face plate 300.

Preferably, the cap 17 has apertures in the region of the rear face of the face plate 300.

The main and auxiliary bridges are therefore mounted flat on the face plate 300 or on the rear bearing 14.

In this example the said bridges comprise current rectifying elements in the form of diodes. These diodes are in practice in the form of diodes of the pressfit type, that is to say they are force-fitted into apertures formed in dissipators, which are electrically insulated and mounted flat on the rear bearing or the face plate 300. In FIGS. 1 and 4, two of these diodes can be seen force-fitted by means of a knurled body on a dissipator which in this example is of metal, for improved heat evacuation. The rear dissipator 201 is called the positive dissipator 201, because it is connected to the positive terminal of the battery of the vehicle, via the power supply line in FIG. 5 or 6, while the front dissipator 202 is called the negative dissipator because it is connected to the earth of the vehicle. In another version, the diodes are soldered on their associated dissipators.

The diodes have tails 209 which are directed towards the rear of the bearing 14 or face plate 300, passing through apertures formed in a connector 200. This connector has a network of electrically conductive tracks encapsulated within an electrically insulating material by an in situ moulding process. These tracks have axially oriented lugs which are bare in the region of the tails 209 of the diodes, so that they can be soldered to the latter.

The connector also has insulating bushes 207 through which there pass fastening members which in this example are screws 208, for fastening the connector to the face plate 300 or the bearing 14. Each bush 207 is shouldered, for gripping the dissipators 202, 201 between the shoulders of the bushes 207 and the rear face of the face plate 300 or bearing 14.

An electrical insulator 204 is of course interposed between the dissipators 202 and 201. Similarly, an electrical insulator 203 may be interposed between the negative dissipator 202 and the rear face of the face plate or bearing.

Figure 7:
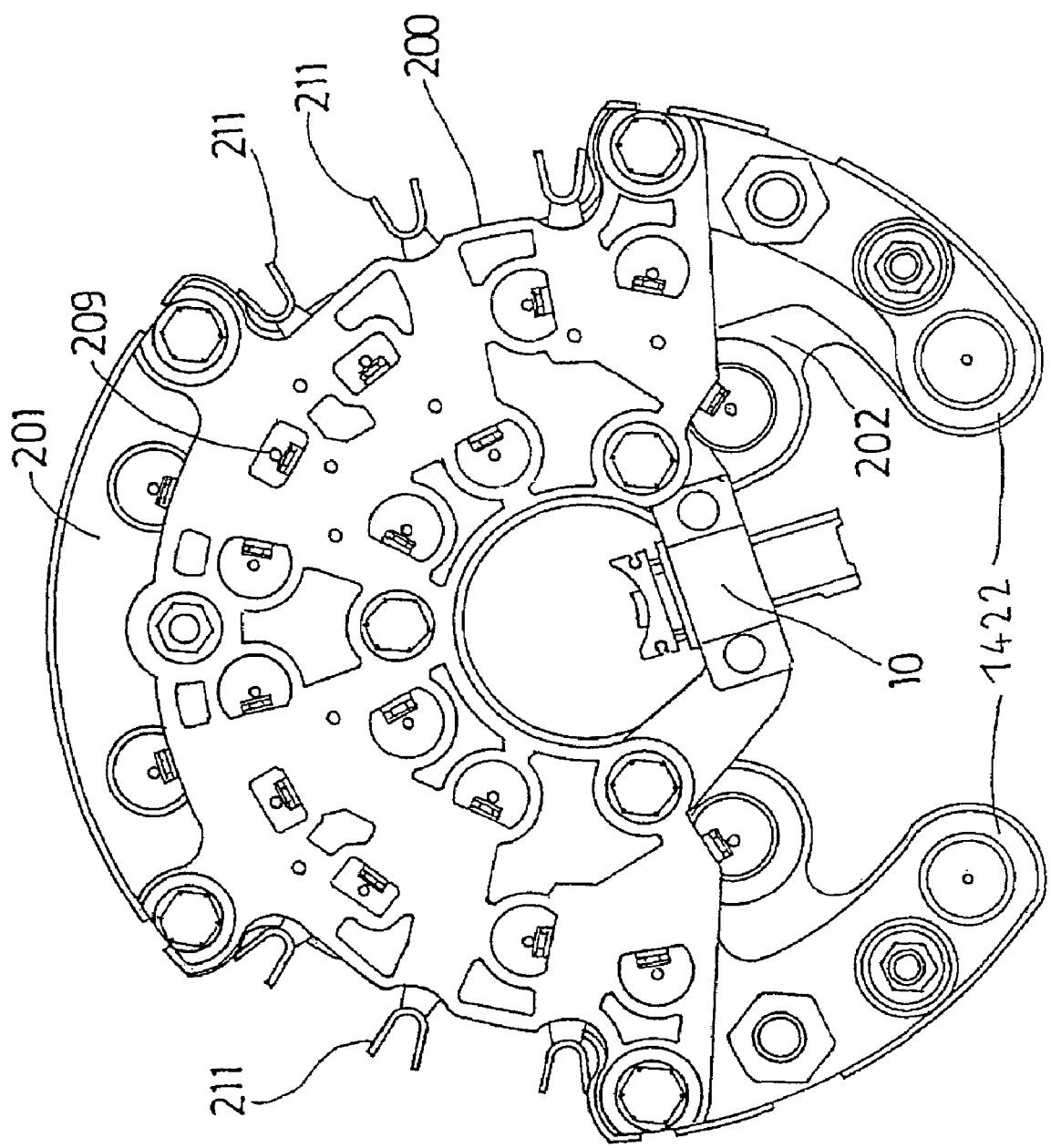
FIG. 7 is a view as seen in the direction of the arrow 7 in FIG. 1, but without the end cap and rear bearing of the alternator.

The connector 200 also has lugs 211 for fastening the ends of the coils of the stator which are part of the armature windings, as can be seen in FIG. 7.

In accordance with one feature, the inner periphery of the positive dissipator 201 is of castellated form so as to define openings for the passage of the negative diodes of the main bridges P1 and P2. The positive diodes are accordingly located on a radius which is greater than that of the negative diodes. The dissipators are in the form of annular sectors extended by fastening lugs 1422, for mounting between the latter of a support 400 with lugs for connecting it with the main bridges. The support 400 in this example carries the three above mentioned transistors T1, together with the voltage limiting circuit 500.

The circuit 500 is of the same type as that described in the document EP-A-1 032 110, to which reference should be made for more details. This circuit is associated with the voltage regulator, and comprises a controlled power interrupter connected in series with the excitation winding of the rotor 4. This interrupter is controlled by means responsive to the occurrence of an over-voltage of the output of the alternator, whereby to block the power interrupter until the voltage at the terminals of the excitation winding 5 has reached a given reverse demagnetisation voltage.

Figure 8:
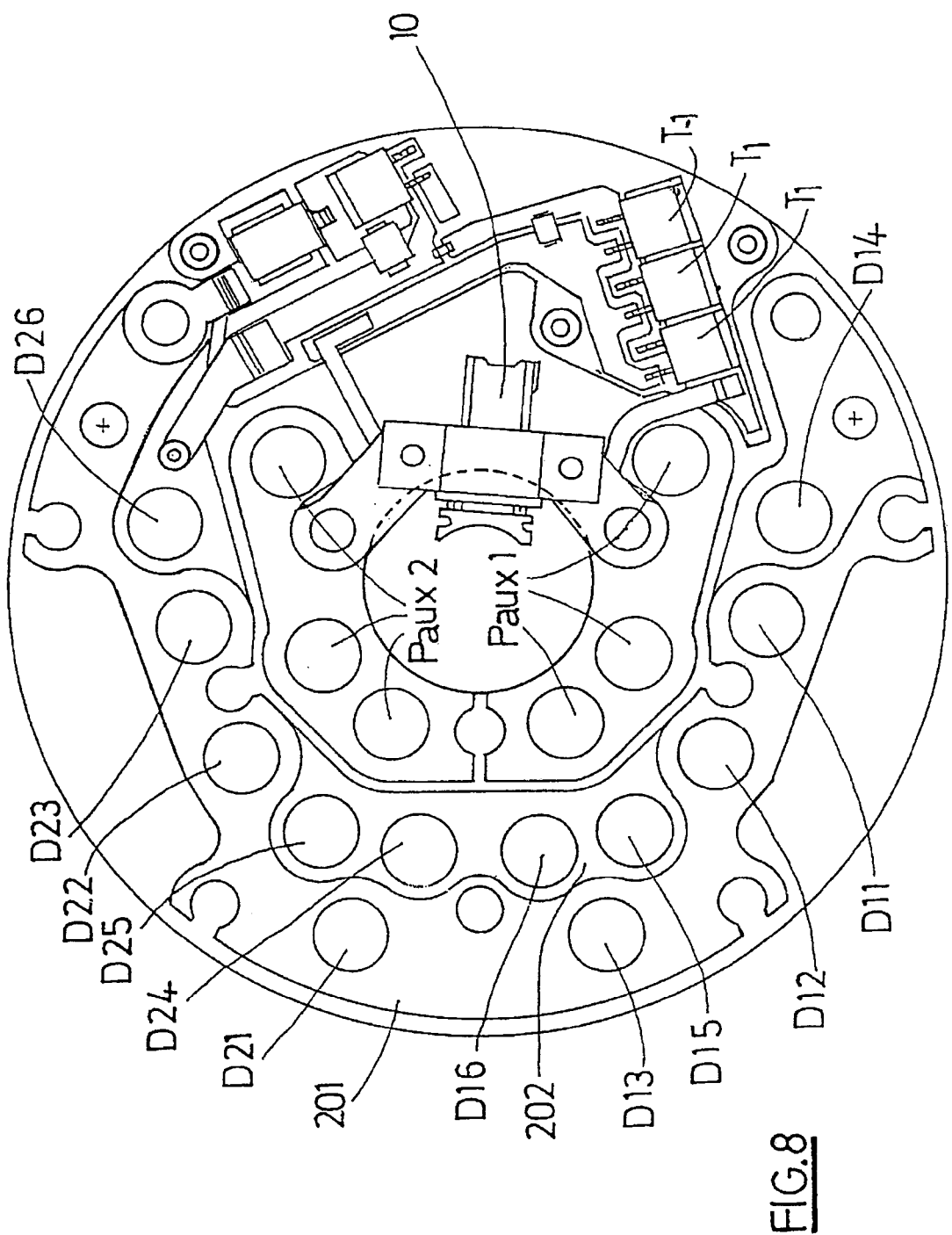
FIG. 8 is a view in the direction of the arrow 7 in FIG. 1, without the end cap and the connector of the current rectifying device.
Figure 9:
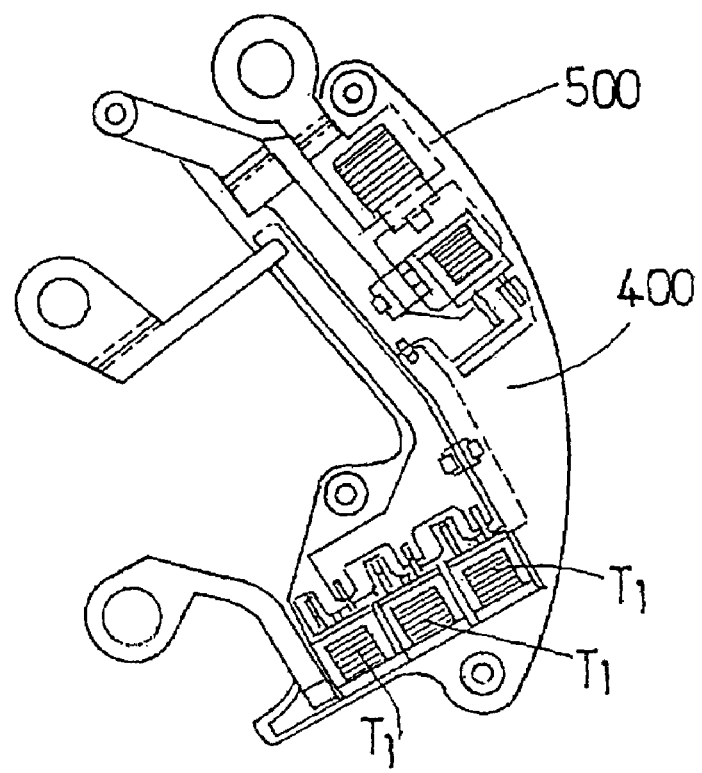
FIG. 9 is a view of the sub-assembly consisting of a voltage limiting circuit with interrupters in the current rectifying device.

The brush holder 10 projects at the centre of the rectifying device 11, as can be seen in FIG. 8; the face plate 300 or the bearing is formed with a central hole. Preferably, a ceramic or plasma coating could be used as protection for the dissipators and give protection against salt spray and corrosion. The power module carried by the support 400 and comprising the transistors T1, and the circuit 500, is made, in another practical version, on an insulated substrate of the SMI type, or is made by power technology.

It will be noted that the voltage regulator and the rectifying device 11 are configured in the present case in such a way as to work with a 42V on-board network.

In another version, the main and auxiliary bridges may be made using power technology.

Figure 10:
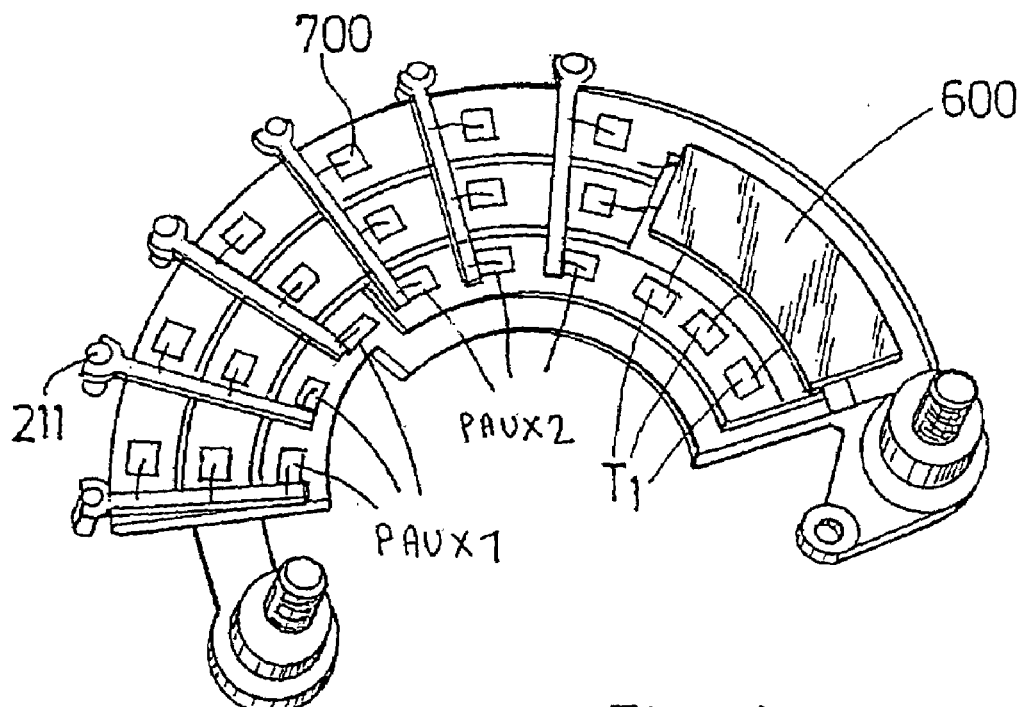
FIG. 10 is a perspective view of an integrated assembly comprising the rectifying device.

More precisely, the whole of the functions of rectification of series-parallel current switching are grouped on a common substrate or on a plurality of substrates permitting transfers of bare-chip components, This concept is very suitable where the face plate 300 or rear bearing are water cooled. FIG. 10 shows this.

In this example, the alternator comprises two sources, as mentioned above and six armature windings. The twelve bare-chip diodes of the main bridges and auxiliary bridges are grouped in six radial sectors of three diodes, on a common substrate, together with the three transistors T1 and a sub-assembly 600 consisting of a voltage regulator and limiting circuit.

As will have been understood, the diodes of the proposed devices may be replaced by diodes of the Zener type with an appropriate limit voltage, or again with so-called SHOTTKY diodes.

In a further version, it is possible with advantage to replace the three-phase windings of the second source, delta wound and given the reference numerals N21, N22 and N23 in FIG. 3, by a star wound winding.

Arrangements of the type comprising two armature windings which are delta wound only, have a lower wave ratio equal to twice the number of phases in each armature winding, for example an order of 6 for a three-phase winding.

In all of the embodiments described above, the delta wound and star wound armature windings are of course interchangeable.

The invention can of course be applied to motor vehicle alternators of the type described above but including a wound stator with large diameter conductors in the form of bars. Such a stator winding is described for example in the document WO92/06257. Conductors in the form of bars fill well the slots in the stator body, and are generally made in the form of hairpins, preferably of round, square or rectangular cross section. Conductors in the form of bent bars can for example, with advantage, replace the hairpins.

Thanks to the invention, such a stator winding with large conductors in the form of bars will be able to be cooled easily.

The arrangement of the stator within the casing delimited by the bearings 13, 14 is preferably applicable to motor vehicle alternators or to electrical machines of the "alternator-starter" type, which are known per se and which are adapted to work alternatively as starter motors and as alternators. For more details, reference should be made to Application FR-00 03131 filed on 10 Mar. 2000.

Figure 11:
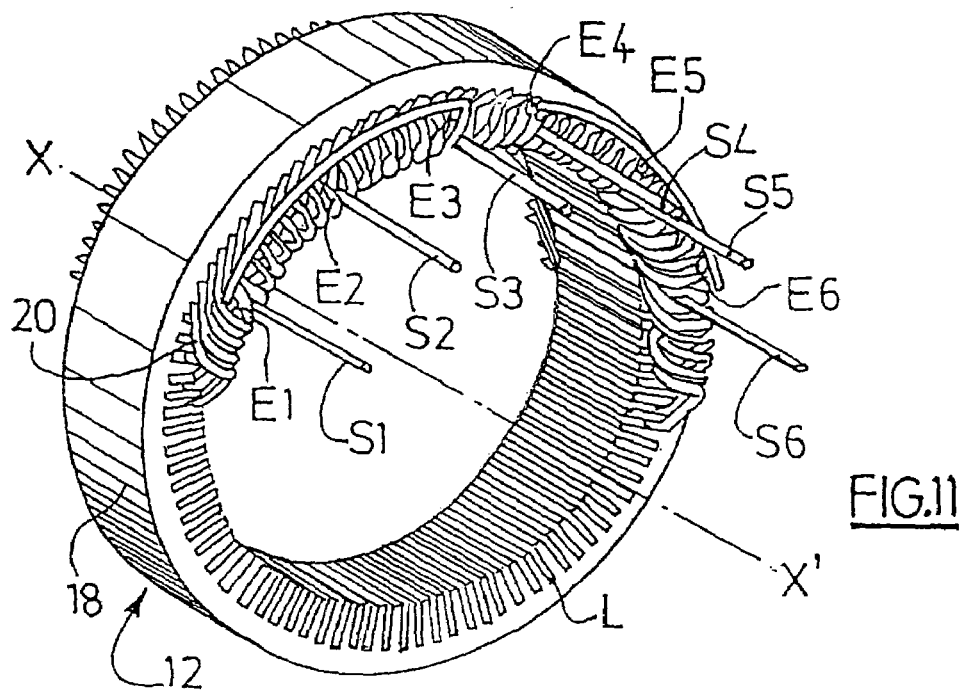
FIG. 11 is a perspective view of the stator from FIG. 1, with conductive elements removed so as to show the slots in the body.
Figure 12:
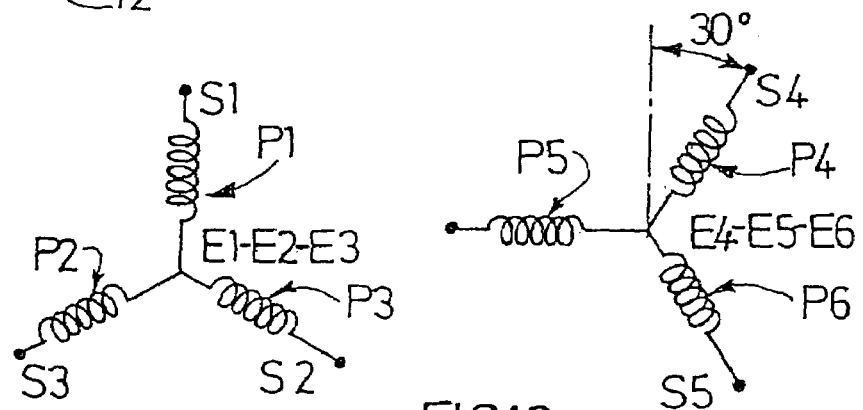
FIG. 12 is a diagrammatic representation of one example of the connection of the phase windings.

FIGS. 11 and 12 show solutions with delta windings, and a stator 12 comprising a cylindrical body 18 with an axis X—X' and two sets of three phases P1 to P3 and P4 to P6, constituting two sets of three-phase windings offset by 30° electrical, and being in the form of a six-phase winding seen from the side of the rectifier device. In the interests of simplicity in the remainder of this description, six-phase is to be understood to mean two sets of three-phase windings offset by 30° electrical, with each three-phase winding being star wound and having an independent neutral point.

Each phase P1 to P6 is constituted by a plurality of electrically conductive elements 20, which are connected in series along the periphery of the stator 12 between a respective input E1 to E6, and a respective output S1 to S6, whereby to constitute at least one phase winding for each phase.

Figure 13:
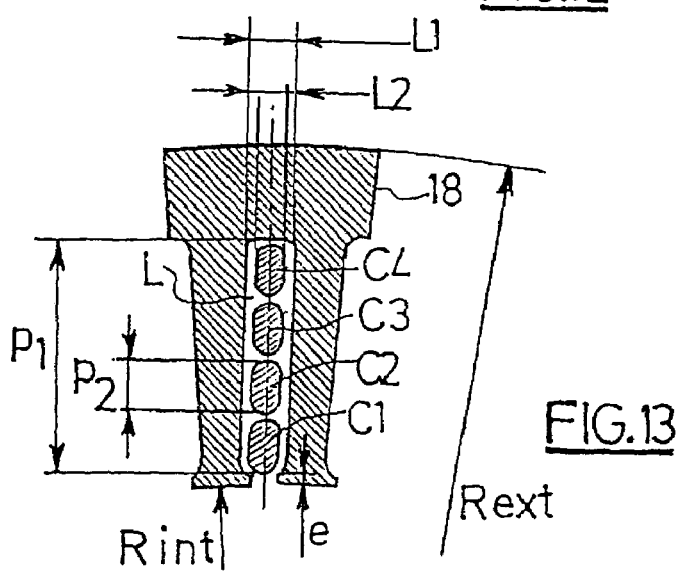
FIG. 13 is a view in transverse cross section showing the arrangement of the conductive elements in a slot in a first embodiment of the invention.

As FIG. 11 shows, the cylindrical body 18, also referred to as the stack of laminations, includes in its radially inner face radial notches L for receiving at least four phase conductor elements 20. The conductor elements 20 are juxtaposed in the slot L in the radial direction whereby to constitute at least four beds of conductor elements C1 to C4, as is shown in FIG. 13 for the case of slots with four conductor elements.

Each conductor element 20 is in the form of a hairpin extending between two slots L and comprising a first branch which is placed in a slot in a predetermined bed, a second branch disposed in another slot in a predetermined bed, and, between the two branches, a head which forms a U when seen in the peripheral direction of the stator.

The U-shaped heads are in general all disposed on a first axial side of the body 18, to form a first chignon.

The branches of the conductor elements have free end portions which extend beyond a second axial side of the body 18, each free end portion being electrically connected to a free end portion of a branch of another conductor element, for example by soldering, thus forming phase windings. The free end portions constitute the second chignon.

One half of the conductor elements 20 engaged by their first branches in a first slot L is engaged by their respective second branches in a common second slot, each forming the said U shapes between the two slots. The branches all extend parallel to the axis X–X'.

The conductor elements 20, the inputs E1 to E6 and the outputs S1 to S6 are in the form of metallic bars, typically of copper and typically of rectangular cross section, although other forms of cross section may be envisaged such as circular or oval cross sections.

The slots L extend over the whole axial length of the body 18. They are oblong in their radial shape, and are of the half closed type, as can be seen in FIG. 13. The slots L are distributed circumferentially at regular intervals.

The conductor elements 20 are fitted axially by insertion in the slots L. They may also be fitted radially, the slots L being then closed with wedges or by plastic deformation of the edges of the slot.

The intermediate U-shaped portions are twisted so that they can pass from a branch situated on one bed to a branch situated on another bed at a different level. Each phase or armature winding therefore comprises two coils. All of the arrangements described in the document FR 01 13553, filed on Oct. 19, 2001, may be envisaged.

The invention claimed is:

1. An alternator, for a motor vehicle, comprising a stator (12), a rotor (4) disposed within the stator (12) and carrying at least one excitation winding (5), the stator (12) having a plurality of phases, wherein the stator comprises at least two armature windings connected to a current rectifier device (11) of an apparatus for supplying electrical power, in particular for an on-board network of a motor vehicle, and wherein each armature winding is part of a power supply source connected between earth and a supply line, each source comprising at least one armature winding and a bridge of rectifying diodes; with one of the sources comprising an auxiliary bridge of rectifier elements of positive type, the other an auxiliary bridge of rectifier elements of negative type, with a means, connected to one and to the other of the said two bridges, being adapted to be controlled, for the purpose of:

in a first state, connecting the two auxiliary bridges in series, the rectified voltage supplied to the supply line being then the sum of the voltages supplied by the armature winding or windings of each of the two sources and rectified, in a second state, blocking the connection between the two sources, which then feed the power supply line in parallel, wherein the auxiliary bridges of rectifying elements are arranged centrally with respect to the bridges of rectifying diodes of the two sources, and wherein the bridges are carried by a support which is fixed with respect to a rear bearing of the alternator.

2. An alternator according to claim 1, characterised in that it is the rear bearing (14) itself that carries the rectifier bridges.

3. An alternator according to claim 1, characterised in that the bridges are carried by a face plate (300), which is fixed with respect to the rear bearing of the alternator.

4. An alternator according to claim 2, wherein one of the rear bearing, and the face plate fixed with respect to the rear bearing, is water cooled.

5. An alternator, for a motor vehicle, comprising a stator (12), a rotor (4) disposed within the stator (12) and carrying at least one excitation winding (5), the stator (12) having a plurality of phases, wherein the stator comprises at least two armature windings connected to a current rectifier device (11) of an apparatus for supplying electrical power, in particular for an on-board network of a motor vehicle, and wherein each armature winding is part of a power supply source connected between earth and a supply line, each source comprising at least one armature winding and a bridge of rectifying diodes; with one of the sources comprising an auxiliary bridge of rectifier diodes of positive type, the other an auxiliary bridge of rectifier diodes of negative type, with a means, connected to one and to the other of the two bridges, being adapted to be controlled, for the purpose of:

in a first state, connecting the two auxiliary bridges in series, the rectified voltage supplied to the supply line being then the sum of the voltages supplied by the armature winding or windings of each of the two sources and rectified, in a second state, blocking the connection between the two sources, which then feed the power supply line in parallel, wherein the diodes are grouped by phase and carried by a rear bearing of the alternator.

6. An alternator according to claim 1, wherein the means connecting the two auxiliary bridges to each other preferably includes at least one transistor of the CMOS type interposed between the two auxiliary bridges.

7. An alternator according to claim 6, characterised in that a plurality of transistors of the CMOS type, mounted in parallel, are provided.

8. An alternator according to claim 7, characterised in that the transistors are integrated with the bridges of rectifying diodes, being mounted on the rear bearing or on the face plate fixed with respect to the rear bearing.

9. An alternator according to claim 8, characterised in that a voltage limiting circuit is associated with the bridges and with the CMOS type transistors.

* * * * *